(12) United States Patent
Roth (10) Patent No.: US 12,297,905 B2
(45) Date of Patent: May 13, 2025

(54) ACTUATOR, AND DEVICE FOR ENGAGING A PARKING LOCK OF A MOTOR VEHICLE AUTOMATIC TRANSMISSION HAVING SUCH AN ACTUATOR, AND MOTOR VEHICLE EQUIPPED THEREWITH

(71) Applicant: Kuster Holding Gmbh, Ehringshausen (DE)

(72) Inventor: Karsten Roth, Ehringshausen (DE)

(73) Assignee: Küster Holding GmbH, Ehringshausen (DE)

( * ) Notice: Subject to any disclaimer, the term of this patent is extended or adjusted under 35 U.S.C. 154(b) by 44 days.

(21) Appl. No.: 18/258,339

(22) PCT Filed: Dec. 16, 2021

(86) PCT No.: PCT/EP2021/086307
§ 371 (c)(1),
(2) Date: Jun. 20, 2023

(87) PCT Pub. No.: WO2022/136130
PCT Pub. Date: Jun. 30, 2022

(65) Prior Publication Data
US 2024/0035567 A1 Feb. 1, 2024

(30) Foreign Application Priority Data

Dec. 21, 2020 (DE) .......................... 102020134504.6

(51) Int. Cl.
*F16H 63/30* (2006.01)
*G01D 5/20* (2006.01)

(52) U.S. Cl.
CPC ........... *F16H 63/304* (2013.01); *G01D 5/202* (2013.01); *F16H 2063/3056* (2013.01); *F16H 2063/3066* (2013.01)

(58) Field of Classification Search
CPC ............... F16H 63/3458; F16H 63/304; F16H 2063/3056; F16H 2063/3066;
(Continued)

(56) References Cited

U.S. PATENT DOCUMENTS 11,118,679 B2 * 9/2021 Blücher ................ F16H 63/304
2010/0107811 A1 * 5/2010 McCloy .................. F16D 28/00
74/665 F (Continued)

FOREIGN PATENT DOCUMENTS

CN 108036053 A * 5/2018
DE 10045953 B4 7/2009
(Continued)

*Primary Examiner* — Bobby Rushing, Jr.
(74) *Attorney, Agent, or Firm* — Rogowski Law LLC (57) ABSTRACT

The invention relates to an actuator having a drive (2) driving an input shaft (1), a first actuation element (3) in operative connection with the input shaft (1) for actuating a shifting mechanism, and a rotatably mounted rotation element which can be driven by means of the input shaft (1) and has a first control cam (7) for controlling the actuating position of the actuator, which control cam is operatively connected to the first actuation element (3) for actuating the shifting mechanism. According to the invention, the actuating position of the actuator can be determined inductively by means of a receiving or holding element (10) for a position indicator (11), said receiving or holding element being operatively connected to the rotation element (4).

18 Claims, 6 Drawing Sheets

(58) Field of Classification Search
CPC ... F16H 63/3491; F16H 63/285; G01D 5/202;
G01D 5/2013
See application file for complete search history.

(56) References Cited

U.S. PATENT DOCUMENTS

2019/0383392 A1  12/2019  Spratte et al.
2020/0032898 A1   1/2020  Blucher et al.

FOREIGN PATENT DOCUMENTS

| DE | 102011014815 A1 | 10/2011 |
| DE | 102016223560 A1 | 5/2018 |
| DE | 102018221916 A1 | 6/2020 |
| WO | 2009135503 A1 | 11/2009 |
| WO | 2017182555 A1 | 10/2017 |

* cited by examiner

ACTUATOR, AND DEVICE FOR ENGAGING A PARKING LOCK OF A MOTOR VEHICLE AUTOMATIC TRANSMISSION HAVING SUCH AN ACTUATOR, AND MOTOR VEHICLE EQUIPPED THEREWITH

CROSS-REFERENCE TO RELATED APPLICATIONS

This application is a national stage application (under 35 USC § 371) of PCT/EP2021/086307, filed Dec. 16, 2021, which claims benefit of DE 102020134504.6, filed Dec. 21, 2020, the contents of each of which is incorporated by reference herein.

BACKGROUND OF THE INVENTION

Technical Field and State of the Art

The invention relates to an actuator, a device for activating a parking lock of a motor vehicle automatic transmission, and to a motor vehicle equipped therewith.

The use of automatic shift actuations or shift-by-wire systems in motor vehicles offers certain advantages as compared with mechanically coupled shift actuations. Thus, for example, the shift stages of the transmission can be selected flexibly and by software, depending on the vehicle state. The activation of the parking lock by engaging the P stage is also no longer done manually by the driver here, but rather is automatically ensured by the control software, for example when stopping or leaving the vehicle. Since an engagement of the P stage for activating the parking lock before leaving the motor vehicle is absolutely necessary for safety reasons, such systems and actuators have emergency mechanisms which are intended to ensure an engagement of the P stage even in the event of faults of the actuators or a voltage failure. These emergency mechanisms typically operate with energy accumulators, such as, for example, mechanical spring elements, which ensure, for instance, the engagement of a mechanical emergency position independently of the actuator.

An actuator according to the preamble of patent claim 1 is known from DE 10 2011 014 815 A1. In this, a motor vehicle parking lock actuator having at least one spindle is described, wherein a longitudinal movement is realized from a rotational movement of a motor for the automatic shifting of a gear stage. The emergency function for engaging the parking lock is realized in this case by a spring element which is preloaded by the actuation of the nonparking position of the actuator and which is held mechanically by a latching mechanism. A shift function to trigger the emergency mechanism for engaging the P stage is intended to occur by a voltage source independent of the actuator. The drawback with this actuator, however, is that an independent voltage source is needed to trigger the emergency mechanism. Therefore, the P stage cannot be engaged when the independent voltage source also is not available, which may occur in particular if the battery of the motor vehicle is discharged and no other voltage source is available either, such as, for example, a properly functioning generator.

DE 100 45 953 B4 discloses a parking lock device which is intended in particular for a motor vehicle provided with an automatically controllable transmission. The parking lock device has an actuating device which comprises an actuating element for actuating a parking lock, a spring accumulator for activating the parking lock, a controllable actuating drive for deactivating the parking lock, and a locking device for arresting the parking lock in the deactivated state. The actuating drive is designed to be electromechanically active and is connected to a main actuating lever. The spring accumulator, the actuating drive and the locking device can be connected or operatively connected to the actuating element via the main actuating lever.

A disadvantage with known actuators is that their actuating position, in particular in the event of a power failure of the actuator or a mechanical failure of the coupling of the actuator to the actuating device, cannot be reliably determined. Furthermore, the motor movement in some actuators does not correspond proportionally to the path of the actuator actuating output such that in this respect the movement of a transmission element, for example an actuating cable, cannot be exactly determined either.

It is therefore an object of the invention to develop an actuator in such a way that it is ensured that the actuating position of the actuator is reliably detected in all situations, in particular in the event of the voltage supply failure or in the case of mechanical problems of the actuator. It is also an object of the invention to provide a device for engaging a parking lock of a motor vehicle automatic transmission having such an actuator and to provide an improved motor vehicle.

SUMMARY OF THE INVENTION

The actuator according to an embodiment of the invention has a drive, which drives an input shaft, and a first actuating element, which is operatively connected to the input shaft, for actuating a shift device, in particular of a motor vehicle.

Also provided is a rotatably mounted rotary element which can be driven by means of the input shaft and which has a first control cam which is operatively connected to the first actuating element for actuating the shift device.

According to this embodiment of the invention, the actuating position of the actuator can be determined inductively by means of a receiving or holding element, which is operatively connected to the rotary element, for a position indicator.

To leave the P stage and engage the different shift stages, for example R, N, D, the rotary element can be rotated by means of the drive and the input shaft in such a way that the first control cam can move the first actuating element on account of the active contact with the first control cam. A shift device, for example having a shift cable pull or having a shift rod, which connects the actuator and the automatic transmission is designed to transmit the movement produced at the actuator to the automatic transmission such that the P stage can be left and different shift stages, for example R, N, D, can be engaged.

For this purpose, the first control cam can have different gradients for the shifting movement or for engaging the shift stages. The gradient of the control cam can be designed, for example, such that sufficient actuating force can be generated under all conditions for disengaging the parking lock by means of the actuator or an emergency adjusting device. Here, the actuating force is substantially the minimum adjusting force required in the transmission for engaging different shift stages.

The inductive measuring principle is based on the fact that a variable magnetic field generates an eddy current in a metallic material.

A coil, which is part of an oscillating circuit, generates the magnetic field in the inductive measuring system. If an electrically conducting object is situated within the magnetic field, eddy currents are generated therein in accordance with Faraday's induction law. These eddy currents in turn form a magnetic field which is directed counter to the original field and thus changes the impedance of the coil. This impedance change can be detected in the oscillating circuit with high sensitivity and thus gives a measure of the position of the position indicator. The evaluation of this impedance change and the signal processing can be implemented in a controller. This method functions with all electrically conductive measurement objects, either consisting of ferromagnetic or non-ferromagnetic metals.

The magnetic field generated by the coil can be provided in an integrated circuit, for example on a printed circuit board.

The actuator position is advantageously reliably detected on account of this inductive measuring method. Additional reference runs of the actuator, for example after switching on the system, are not necessary. This measuring system is particularly advantageous in actuators in which the motor movement does not correspond proportionally to the path of the actuator actuating output. The motor movement is also reliably detected in these actuators. A high measuring accuracy is possible owing to the invention. Furthermore, the inductive measuring system is easy to mount and is insensitive to mechanical tolerances. The inductive measuring systems are also insensitive to a high degree to temperature fluctuations.

So-called "nonsafe" states, that is to say states in which the reliable function of the actuator is not ensured, are determined exactly even in the case of a system failure of the actuator.

Advantageously, no additional speed sensors on the drive or on the rotary element are necessary, in particular with there also being no need for a magnetic wheel, magnets or Hall sensors for position determination. This is because the actuating position of the actuator, which is predetermined by the first control cam, is reliably monitored by the position indicator.

In the event that the mechanical coupling to the rotary element acting as a control disk is defective and in the event of a movement of the actuator output into possibly "nonsafe" regions, the inductive sensor system detects this region and an optical or acoustic warning or alarm signal can be output.

According to a first advantageous embodiment of the invention, the receiving or holding element has a second actuating element for engaging in a second control cam provided on the rotary element. This is because, on account of the second control cam, which controls or activates the position indicator, the actuating position of the actuator predetermined by the first control cam is reliably monitored. In this way, mechanical coupling of the position indicator to the rotary element is implemented such that the actuating position of the actuator can be exactly determined on account of the angle position of the rotary element that is indirectly determined by the inductive measurement. The angle position of the rotary element is converted into a linear position of the position indicator with respect to the magnetic field. Even in the event of a failure or fault of the mechanical attachment, the actuating position of the actuator can nevertheless be reliably determined on account of this measurement. It is also possible to define so-called "safe regions" or "nonsafe regions". In other words, if the position indicator is situated in a "nonsafe region", for example an optical or acoustic alarm signal can be output.

According to a further advantageous embodiment of the invention, there is provision that, for inductive determination of the actuating position of the actuator, the position indicator is arranged at the end of the receiving or holding element that faces away from the rotary element. In this way, the measurement of the actuating position of the actuator occurs at a distance from the rotary element such that the design is more compact overall. In this measuring method, further sensors, such as Hall sensors, for determining the angle position of the rotary element are also not necessary.

According to a further advantageous embodiment of the invention, the position indicator is a small metal plate which is preferably received in a frame and which, for inductive determination of the actuating position of the actuator, interacts with a magnetic field which is preferably formed by conductor loops arranged on a printed circuit board. A redundant measurement of the actuating position of the actuator is carried out by this contactless position measurement on account of the electromagnetic alternating fields. In particular, this linear inductive position measurement can have a transmitting and receiving coil system which are mounted on a common printed circuit board. The position indicator, which "floats" with respect to this coil system, is supplied by a (high-frequency) magnetic alternating field which is generated by the transmitting coil. Corresponding to the position, voltage is induced into the receiving coil system by the position indicator. This inductive measuring principle is particularly advantageous since it is insensitive to magnetic fields and operates in a contactless, wear-free and highly dynamic manner. The phase relationship of the measurement signals is the measure of the current position of the position indicator and is converted by the electronics into a linear position signal. In this way, the position of the position indicator and thus of the rotary element or the actuating position of the actuator can be determined in a highly precise manner.

In a further advantageous variant of the invention, the position indicator arranged in the frame is offset with respect to the actuating element such that the available installation space in the actuator is optimally utilized in spite of restricted space conditions.

According to an advantageous development of the invention, a safety pin is operatively connected to the first actuating element of the first control cam. Furthermore, a stop for the safety pin is provided on the receiving or holding element, wherein the position indicator can be displaced by means of the safety pin. This safety pin moves concomitantly depending on the position of the actuator, that is to say of the rotary element with the control cam. In the event that a defect occurs in the coupling of the receiving or holding element to the rotary element, for example that this coupling tears, the position indicator would then therefore no longer move concomitantly during movement of the rotary element. The actuating position of the actuator would then no longer be able to be determined inductively. For this reason, the stop is provided on the offset region of the receiving or holding element. The safety pin operatively connected to the first actuating element of the first control cam can come up against this stop if the coupling of the receiving or holding element to the rotary element is defective and the position indicator no longer moves concomitantly during movement of the rotary element. The safety pin then displaces the position indicator via this stop.

In order to provide a particularly simple structural embodiment of the rotary element, it has proved successful for the rotary element to take the form of a circular disk on which the two control cams are each arranged on one of the opposite surfaces of the circular disk. In this respect, the control cams can be arranged without problem by means of the corresponding engagement elements without disturbing influences of the respective other control cam or of the engagement element corresponding thereto having to be taken into consideration.

According to an advantageous development of the invention, the receiving or holding element is arranged within the housing of the actuator to save installation space and to further increase the compactness of the actuator.

A first engagement element of the actuating element for actuating a shift device is provided for engaging in the first control cam and a second engagement element of the second actuating element is provided for engaging in the second control cam. In this way, the accuracy and reliability of the control and measurement are further improved.

The rotary element can be limited in the range of its rotary movement between a maximum negative and a maximum positive rotary position on account of the configuration of the first and/or the second control cam such that, for example, half a rotation in a respective directional rotation, that is to say, for instance, +180° or −180°, is possible. In a particularly advantageous embodiment of the invention, this is achieved in that the rotary element with the two control cams is formed in such a way that it can be rotated between a maximum negative angle position at up to −180° and a maximum positive angle position at up to +180° by the input shaft or the drive.

There can advantageously be provision that the first control cam is formed in such a way that the position of the actuating element for actuating a shift device remains unchanged during a rotation of the rotary element from its neutral rotary position of 0° in the direction of its maximum negative rotary position at up to −180°.

According to a further advantageous embodiment of the invention, there is provision that different shift stages of such a shift device can be set by means of the first control cam and the first engagement element of the first actuating element during a rotation of the rotary element from 0° in the direction of the maximum positive angle position, for example up to 180°.

It has also proved to be advantageous here that a worm is arranged on the input shaft and can drive a gearwheel arrangement which in turn drives the rotary element. Here, the rotary element itself can be part of this gearwheel arrangement, with it also being possible that the gearwheel arrangement also consists of only one gearwheel.

Alternatively, it is of course also conceivable that the gearwheel arrangement consists of a plurality of gearwheels which are operatively connected to one another, in which case a gearwheel takes the form of a circular disk which has the corresponding control cams on its opposite surfaces.

A device for engaging a parking lock of a motor vehicle automatic transmission having an above-described actuator is also intended to be independently protected.

Moreover, a motor vehicle is also intended to be independently protected by means of such a device, wherein the motor vehicle has an automatic transmission and an above-described device for engaging a parking lock of the automatic transmission.

According to an advantageous idea of the invention, such a device or a motor vehicle having such a device has a mechanical, electromechanical, electric, electronic, hydraulic or pneumatic emergency adjusting device by means of which the actuating element for actuating a shift device can be moved if the drive cannot be driven.

The emergency adjusting device can consist of a pin on which there is arranged a gearwheel which can be rotated with a tool, in particular an Allen key, via an opening. Here, the gearwheel can be loaded with spring force counter to a restoring force of a spring such that the gearwheel can be brought into operative connection with a spline gear of an output shaft of the drive. By means of this emergency adjusting device it is possible to actuate the rotary element with the aid of a tool, in particular an Allen key, via the output shaft connected directly to the input shaft of the drive, with the result that the first actuating element can be actuated.

Further aims, advantages, features and possible uses of the present invention will emerge from the following description of exemplary embodiments on the basis of the drawings. Here, all of the features described and/or illustrated in the figures form the subject matter of the present invention individually or in any meaningful combination, even independently of the combination thereof in the claims or the back-references of the latter.

DETAILED DESCRIPTION

Figure 1:
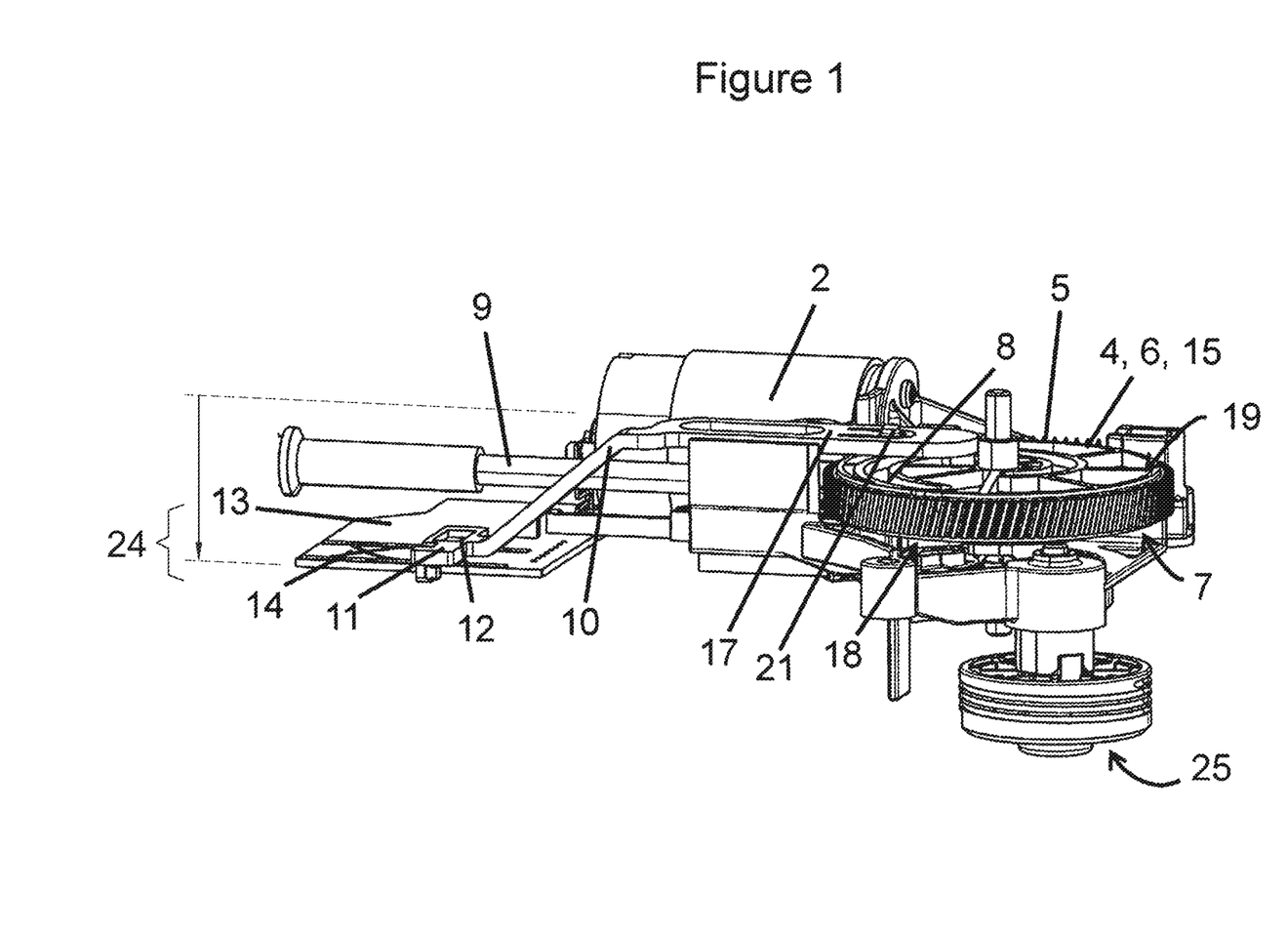
FIG. 1 shows an exemplary embodiment of an actuator according to the invention in a perspective view from the side.
Figure 3:
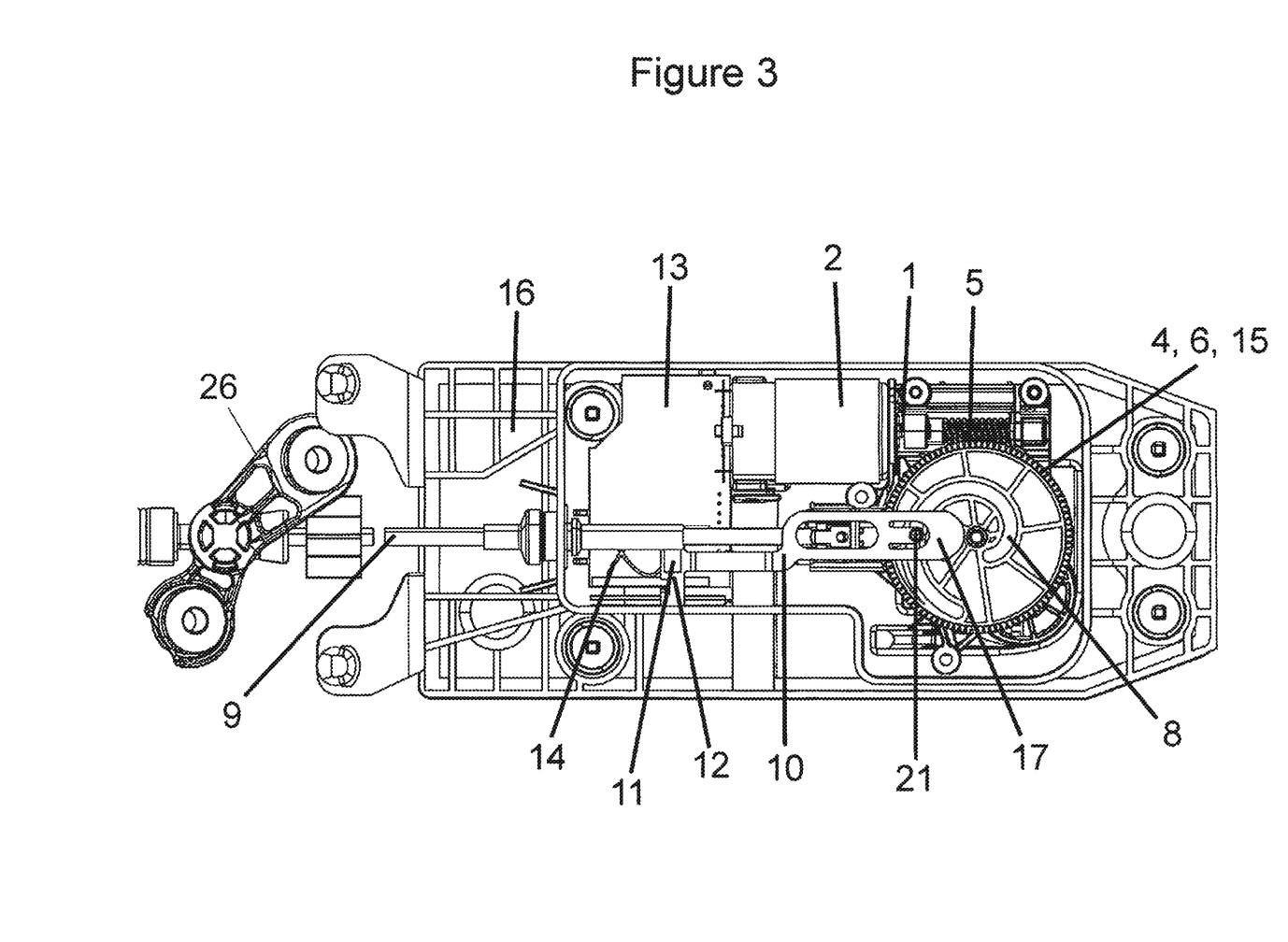
FIG. 3 shows the actuator according to FIG. 1 in a plan view from above.

FIG. 1 shows an exemplary embodiment of an actuator according to the invention. Here, the actuator is, as shown in FIG. 3, arranged on a housing component 16 and can be covered by a housing cover (not shown). Also visible in this illustration is a cable pull 9 by means of which various shift stages of an automatic transmission of a motor vehicle can be set. Here, the cable pull 9 is operatively connected to a first actuating element 3 for actuating the shift device of the motor vehicle automatic transmission of the motor vehicle. This also emerges from FIG. 5 which shows the actuator in an illustration from below.

Figure 2:
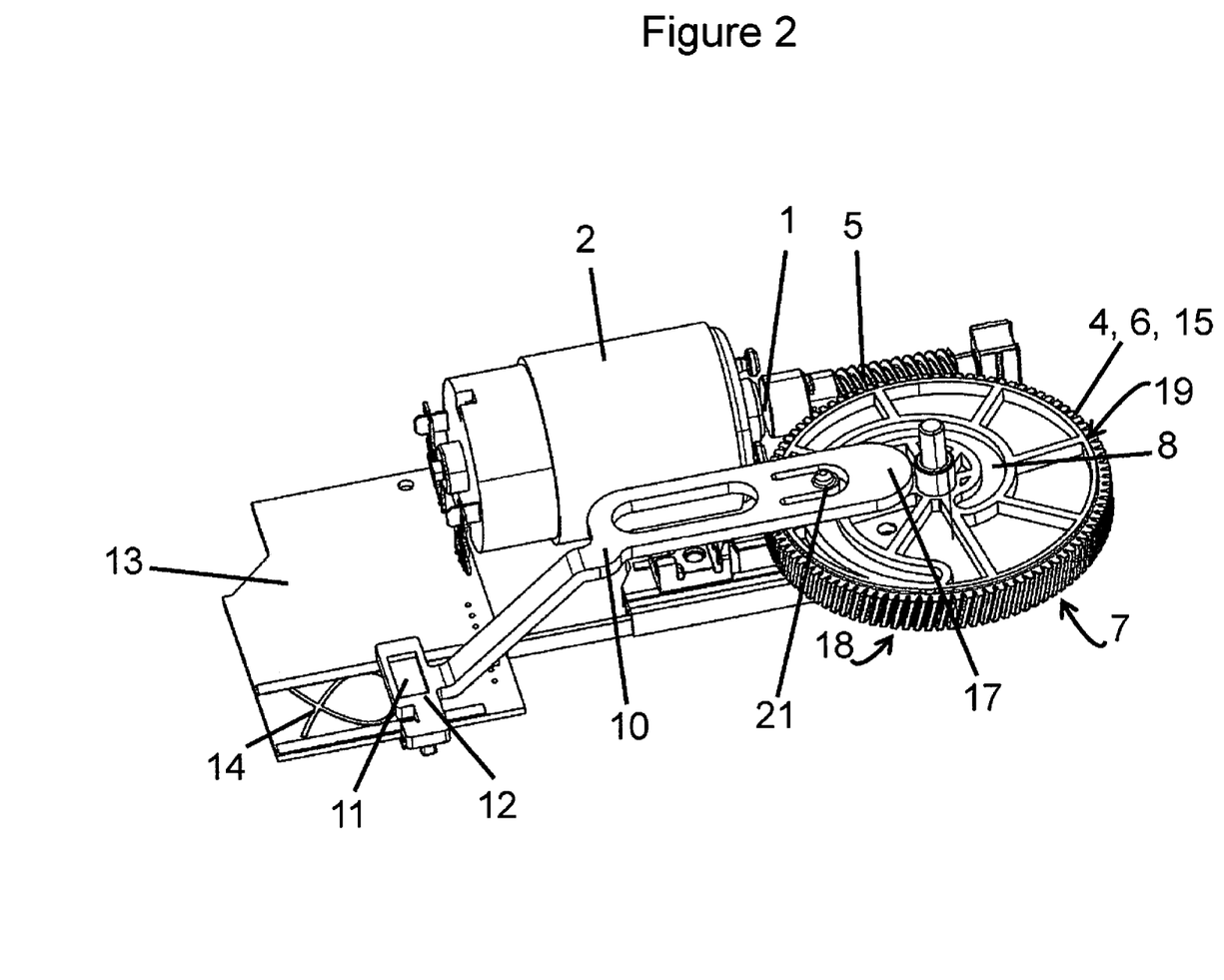
FIG. 2 shows an exemplary embodiment of the actuator according to the invention as shown in FIG. 1 in a perspective plan view.

In FIG. 2, the exemplary embodiment of the actuator according to the invention is now shown in a perspective illustration from above. There can be clearly seen here the rotary element 4 which takes the form of a gearwheel 15 and is also designed as a circular disk 6. Here, the rotary element 4 is rotatably mounted at its center point and has two different control cams 7 and 8 on its opposite surfaces 18 and 19. In the present case, the gearwheel 15, which can also be part of a gearwheel arrangement, meshes with a worm 5, which is shown in FIGS. 1 and 2, of an input shaft 1 of a drive 2.

Figure 5:
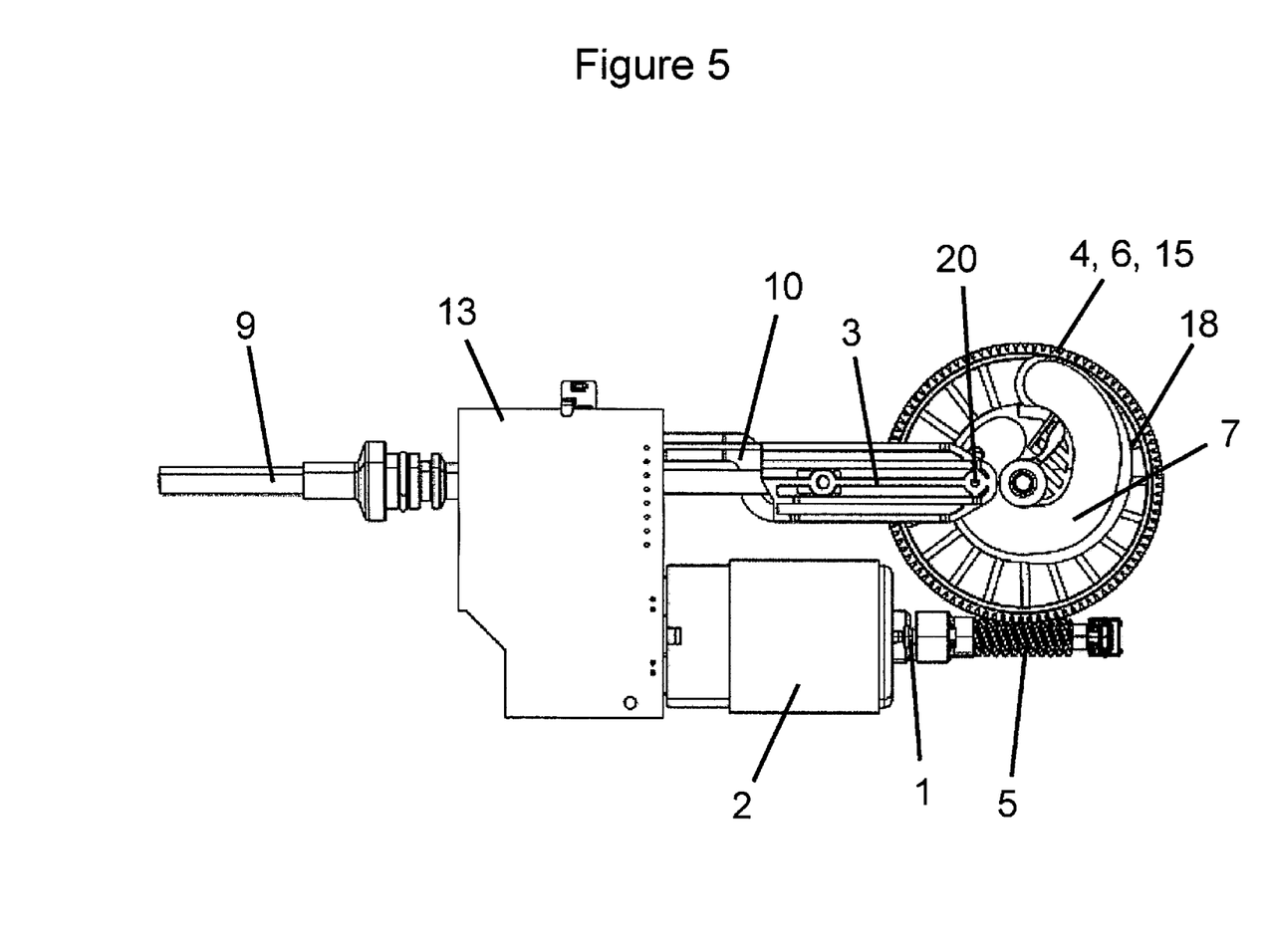
FIG. 5 shows the actuator according to FIG. 1 in an illustration from below.

FIG. 5 shows the first actuating element 3 which, on the one hand, is provided with a first engagement element 20 which, for engagement, engages in the first control cam 7, and, on the other hand, is connected to the cable pull 9 of a shift device of the automatic transmission of the motor vehicle.

In FIG. 2, the actuator is now illustrated in a perspective view from above and, in FIG. 3, in a plan view from above. The rotary element 4 which takes the form of a circular disk 6 and gearwheel 15 and which is rotatably mounted can be seen particularly clearly here. The drive 2 with its input shaft 1 can now also be seen in this illustration, wherein the worm 5 is arranged on the input shaft 1 and meshes with the gearwheel 15.

As emerges from FIGS. 1 to 6, the actuating position of the actuator can be determined inductively by means of a receiving or holding element 10, which is operatively connected to the rotary element 4, for a position indicator 11.

A coil, which is part of an oscillating circuit, generates the magnetic field in the inductive measuring system. If an electrically conducting object is situated within the magnetic field, eddy currents are generated therein in accordance with Faraday's induction law. These eddy currents in turn form a magnetic field which is directed counter to the original field and thus changes the impedance of the coil. This impedance change can be detected in the oscillating circuit with high sensitivity and thus gives a measure of the position of the position indicator 11. The evaluation of this impedance change and the signal processing can be implemented in a controller. This method functions with all electrically conductive measurement objects, either consisting of ferromagnetic or of nonferromagnetic metals.

Figure 4:
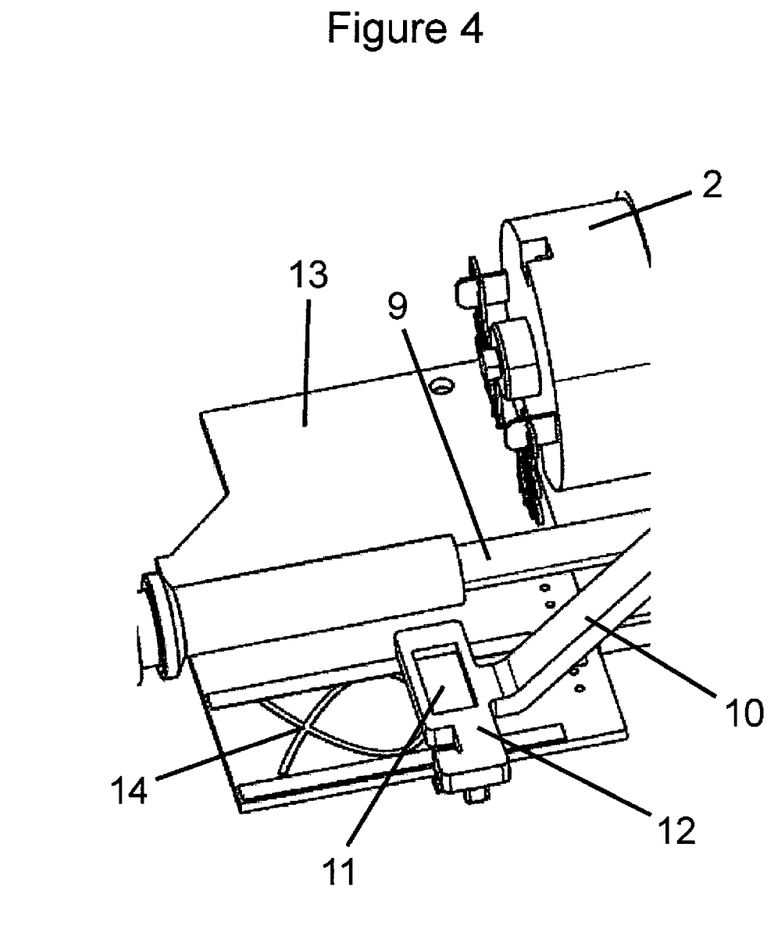
FIG. 4 shows a detail view of the actuator according to FIG. 1 in a perspective plan view from above.

In the present exemplary embodiment, the coil is formed by conductor loops 14 arranged on a printed circuit board 13, as emerges from FIGS. 1 to 3 and in particular from the detail view according to FIG. 4. The magnetic field generated by these conductor loops 14 can be provided in an integrated circuit, for example on the printed circuit board 13.

In this way, the actuator position is reliably detected. In the event of a system failure of the actuator, so-called "nonsafe" states, that is to say states in which the reliable function of the actuator is not ensured, are determined exactly. This is because the actuating position of the actuator, which is predetermined by the first control cam 7, is reliably monitored and output by the position indicator 11.

In the event that the mechanical coupling to the rotary element acting as a control disk is defective and in the event of a movement of the actuator output into possibly "nonsafe" regions, the inductive sensor system detects this region and an optical or acoustic alarm signal can be output. This can occur, where appropriate, by means of evaluation of other sensors in the vehicle, such as, for example, for detecting the wheel speed, or sensors on the transmission.

As can be gathered from FIGS. 1 to 6, the receiving or holding element 10 has a second actuating element 17 for engaging in a second control cam 8 provided on the rotary element 4. This is because, on account of the second control cam 8, which controls or activates the position indicator 11, the actuating position of the actuator predetermined by the first control cam 7 is reliably monitored.

In this way, mechanical coupling of the position indicator 11 to the rotary element 4 is implemented such that the actuating position of the actuator can be determined exactly on account of the angle position of the rotary element 4 determined indirectly by the inductive measurement. The angle position of the rotary element 4 is thus converted into a linear position of the position indicator 11 with respect to the magnetic field.

Even in the event of a failure or fault of the mechanical attachment, the actuating position of the actuator can nevertheless be reliably determined on account of this measurement. It is also possible to define so-called "safe regions" or "nonsafe regions". In other words, if the position indicator is situated in a "nonsafe region", for example an optical or acoustic alarm signal can be output.

As further emerges from FIGS. 1 to 6, for inductive determination of the actuating position of the actuator, the position indicator 11 is arranged at the end of the receiving or holding element 10 that faces away from the rotary element 4. In the present case, the position indicator 11 is a small metal plate which is received in a frame 12 and which, for inductive determination of the actuating position of the actuator, interacts with the magnetic field formed by the conductor loops 14 on the printed circuit board 13. A redundant measurement of the actuating position of the actuator is carried out by this contactless position measurement on account of the electromagnetic alternating fields.

The conductor loops 14 can take the form of a transmitting and receiving coil system which are jointly mounted on the printed circuit board 13. The position indicator 11, which "floats" with respect to this coil system, is supplied by the magnetic alternating field which is generated by the transmitting coil. Corresponding to the position of the position indicator 11, voltage is induced into the receiving coil system by the position indicator 11. The phase relationship of the measurement signals is the measure of the current position of the position indicator 11 and is converted by the electronics into a linear position signal. In this way, the position of the position indicator 11 and thus of the rotary element 4 or the actuating position of the actuator can be determined in a highly precise manner.

In the present case, as shown in FIGS. 1 to 4 and FIG. 6, the position indicator 11 arranged in the frame 12 is offset with respect to the second actuating element 17, that is to say it is situated in the offset region 24 of the receiving or holding element 10.

The two control cams 7, 8 are in the present case each arranged on one of the opposite surfaces 18, 19 of the circular disk 6.

The receiving or holding element 10 is arranged within a housing (not shown) of the actuator in order to save installation space and to further increase the compactness of the actuator.

As emerges in particular from FIGS. 1 and 2, a first engagement element 20 of the first actuating element 3 for actuating a shift device is provided for engaging in the first control cam 7 and a second engagement element 21 of the second actuating element 17 is provided for engaging in the second control cam 8. In this way, the accuracy and reliability of the control and measurement are further improved.

The mode of operation of the actuator according to the invention can be gathered in particular from FIGS. 2 and 3. According thereto, the engagement element 20 of the first actuating element 3 is operatively connected to and in engagement with the first control cam 7 which is arranged on the surface 18 of the rotary element 4. If the rotary element 4 designed as a gearwheel 15 is then rotated by means of the drive 2, the input shaft 1 and the worm 5, the actuating element 3 is moved on account of the engagement of the engagement element 20 in the control cam 7 in such a way that, by means of the shift device (not shown here in more detail), which is actuated by the cable pull 9, of the automatic transmission, it is moved out of a shift stage, for example the P stage, and different shift stages, for example R, N, D, can be set. Here, the rotary element 4 is limited in its rotary movement on account of the control cam 7 such that a rotation by approximately +180° to −180° or another value is possible. The parking lock 26 is shown in FIG. 3.

During the rotation of the rotary element 4, the second engagement element 21 of the second actuating element 17 is also displaced in the second control cam 8. This is because, as mentioned, the two control cams 7, 8 are arranged on opposite surfaces 18, 19 of the rotary element 4 such that, during rotation of the rotary element 4, the two control cams 7, 8 therefore correspondingly corotate.

On account of the displacement of the second actuating element 17 with second engagement element 21 arranged on the receiving or holding element 10, the small metal plate, that is to say the position indicator 11, received in the frame 12 is displaced linearly in relation to the magnetic field generated by the conductor loop 14. The positions of the position indicator 11 can thus be precisely determined inductively and contactlessly.

Figure 6:
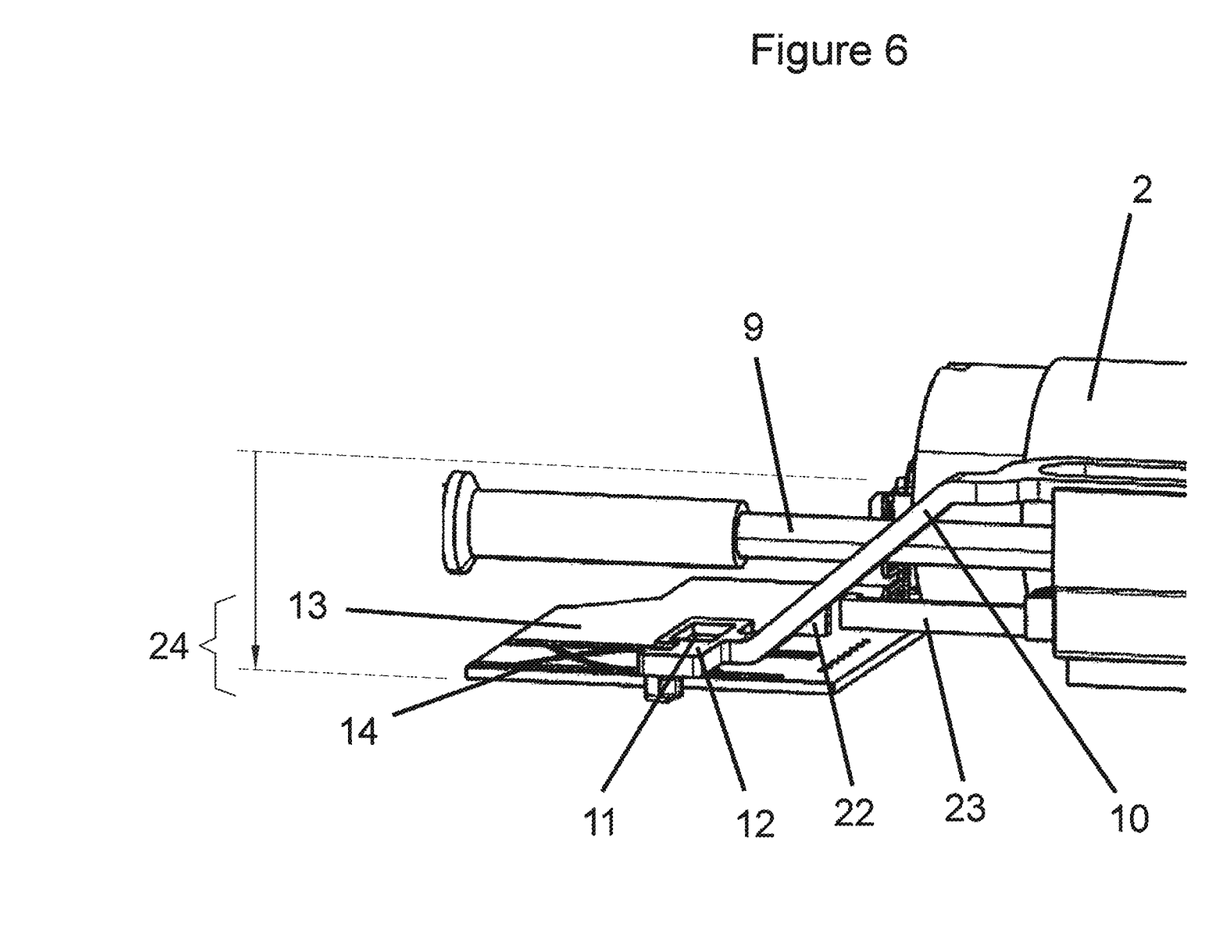
FIG. 6 shows a detail view of the actuator according to FIG. 1 with a safety device in a perspective plan view from above.

FIG. 6 shows a further embodiment of the actuator. Here, a safety pin 23 is operatively connected to the first actuating element 3 of the first control cam 7. This safety pin 23 moves concomitantly depending on the position of the actuator, that is to say of the rotary element 4 with the control cam 7. In the present exemplary embodiment, the safety pin 23 moves linearly, in particular moves in the direction of movement of the position indicator 11 in the normal operating state of the actuator.

As further emerges from FIG. 6, upon actuation of the shift device, the position indicator 11 coupled to the rotary element 4 via the receiving or holding element 10 moves at a small distance in front of the cable pull 9 via the conductor loops 14 or the magnetic field generated thereby.

In the event that a defect occurs during the coupling of the receiving or holding element 10 to the rotary element 4, for example this coupling tears, the position indicator 11 would then therefore no longer move concomitantly during movement of the rotary element 4. The actuating position of the actuator would then no longer be able to be determined inductively.

For this reason, as shown in FIG. 6, a stop 22 is provided at the offset region 24 of the receiving or holding element 10. The safety pin 23 operatively connected to the first actuating element 3 of the first control cam 7 can come up against this stop 22 if the coupling of the receiving or holding element 10 to the rotary element 4 is defective and the position indicator 11 no longer moves concomitantly during movement of the rotary element 4.

The safety pin 23 then displaces the position indicator 11 via this stop 22.

For example, the safety pin 23 can push the position indicator 11 to the actuating position "parking position disengaged" or "R, N, D". The software can then detect this "nonsafe state", that is to say "nonparking position", on account of the defect and output an acoustic or optical warning signal.

FIG. 1 further shows a mechanical, electromechanical, electric, electronic, hydraulic or pneumatic emergency adjusting device 25 by means of which the actuating element 3 for actuating the shift device can be moved if the drive cannot be driven.

The emergency adjusting device 25 can consist of a pin on which there is arranged a gearwheel which can be rotated by a tool, in particular an Allen key, via an opening. Here, the gearwheel can be loaded with spring force counter to a restoring force of a spring such that the gearwheel can be brought into operative connection with a spline gear of an output shaft of the drive 2. By means of this emergency adjusting device 25 it is possible to actuate the rotary element 4 with the aid of a tool, in particular an Allen key, via the output shaft connected directly to the input shaft 1 of the drive 2, with the result that the first actuating element 3 can be actuated.

LIST OF REFERENCE SIGNS

1 Input shaft
2 Drive
3 First actuating element
4 Rotary element
5 Worm
6 Circular disk
7 First control cam
8 Second control cam
9 Cable pull
10 Receiving or holding element
11 Position indicator
12 Frame
13 Printed circuit board
14 Conductor loop
15 Gearwheel
16 Housing component
17 Second actuating element
18 Surface
19 Surface
20 First engagement element
21 Second engagement element
22 Stop
23 Safety pin
24 Offset region
25 Emergency actuating device
26 Parking lock

The invention claimed is:

1. An actuator for a shift device of a motor vehicle automatic transmission, comprising:
    a drive (2) which drives an input shaft (1),
    a first actuating element (3) operatively connected to the input shaft (1) for actuating a shift device,
    a rotatably mounted rotary element (4) configured to be driven by the input shaft (1),
    a first control cam (7) for controlling an actuating position of the actuator that is operatively connected to the first actuating element (3) for actuating the shift device, and
    a position indicator (11) having a receiving or holding element (10) operatively connected to the rotary element (4) that is configured for inductively determining position of the actuator.

2. The actuator as claimed in claim 1, wherein the receiving or holding element (10) has a second actuating element (17) for engaging in a second control cam (8) provided on the rotary element (4).

3. The actuator as claimed in claim 1, wherein the position indicator (11) is arranged at the end of the receiving or holding element (10) that faces away from the rotary element (4).

4. The actuator as claimed in claim 1, wherein the position indicator (11) is a small metal plate is received in a frame (12) and which, for inductive determination of the actuating position of the actuator, interacts with a magnetic field.

5. The actuator as claimed in claim 4, wherein the position indicator (11) with frame (12) is offset with respect to the actuating element (17).

6. The actuator as claimed in claim 4, further comprising conductor loops (14) arranged on a printed circuit board (13) that form a magnetic field with which the position indicator (11) reacts when determining a position of the actuator.

7. The actuator as claimed in claim 1, further comprising a safety pin (23) that is operatively connected to the first actuating element (3) of the first control cam (7) and a stop (22) for the safety pin (23) is provided on the receiving or holding element (10), wherein the position indicator (11) can be displaced by means of the safety pin (23).

8. The actuator as claimed in claim 1, wherein the rotary element (4) takes the form of a circular disk (6) having a first surface (18) and a second surface (19) opposite the first surface (18), and wherein the first control cam (7) is arranged on the first surface (18) and a second control cam (8) is arranged on the second surface (19).

9. The actuator as claimed in claim 1, wherein the receiving or holding element (10) is arranged on or within a housing component (16) of the actuator.

10. The actuator as claimed in claim 1, further comprising a first engagement element (20) of the first actuating element (3) for engaging in the first control cam (7), and a second engagement element (21) of the second actuating element (17) for engaging in a second control cam (8).

11. The actuator as claimed in claim 10, wherein different shift stages of the shift device can be set by means of the first control cam (7) and the first engagement element (20) during a rotation of the rotary element (4) from its neutral rotary position of 0° in the direction of its maximum positive rotary position at up to 180°.

12. The actuator as claimed in claim 1, wherein the rotary element (4) has the first control cam (7) and a second control cam (8), each of which control cam is configured to be rotated by the input shaft (1) or the drive (2) between a maximum negative angle position at up to −180° and a maximum positive angle position at up to +180°.

13. The actuator as claimed in claim 1, wherein the first control cam (7) is configured so that the position the actuating element (3) for actuating a shift device remains unchanged during a rotation of the rotary element (4) from its neutral rotary position of 0° in the direction of its maximum negative rotary position at up to −180°.

14. The actuator as claimed in claim 1, further comprising a worm (11) arranged on the input shaft (1) to drive the rotary element (4) via a gearwheel arrangement (12).

15. A device for engaging a parking lock of the motor vehicle automatic transmission having the actuator as claimed in claim 1.

16. A motor vehicle having the motor vehicle automatic transmission and the device as claimed in claim 15 interacting therewith.

17. The device as claimed in claim 15, further comprising a mechanical, electromechanical, electric, electronic, hydraulic or pneumatic emergency adjusting device (25) that is configured to move the actuating element (3) and/or load a spring element (5) if the drive (2) cannot be driven.

18. A motor vehicle having the motor vehicle automatic transmission and the device as claimed in claim 17 interacting therewith.

* * * * *